United States Patent
Gilleylen et al.

(10) Patent No.: US 9,981,362 B2
(45) Date of Patent: May 29, 2018

(54) APPARATUS AND METHODS FOR HIGH PRESSURE LEACHING OF POLYCRYSTALLINE DIAMOND CUTTER ELEMENTS

(71) Applicant: National Oilwell Varco, L.P., Houston, TX (US)

(72) Inventors: Russell Gilleylen, Spring, TX (US); Guodong Zhan, Spring, TX (US); Sean Donald, Spring, TX (US); Haresh Ghansyam, Pearland, TX (US); James R. Streater, Humble, TX (US); Adondria M. Parker, Houston, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 398 days.

(21) Appl. No.: 14/655,632

(22) PCT Filed: Dec. 30, 2013

(86) PCT No.: PCT/US2013/078247
§ 371 (c)(1),
(2) Date: Jun. 25, 2015

(87) PCT Pub. No.: WO2014/106163
PCT Pub. Date: Jul. 3, 2014

(65) Prior Publication Data
US 2015/0367483 A1  Dec. 24, 2015

Related U.S. Application Data

(60) Provisional application No. 61/747,586, filed on Dec. 31, 2012.

(51) Int. Cl.
*B01J 3/06* (2006.01)
*E21B 10/567* (2006.01)
(Continued)

(52) U.S. Cl.
CPC ............ *B24D 18/0009* (2013.01); *B01J 3/06* (2013.01); *B01J 19/24* (2013.01); *B24D 99/005* (2013.01);
(Continued)

(58) Field of Classification Search
CPC .................. B01J 3/06; B01J 2219/00162; B01J 2219/24; C23F 1/00; C23F 1/08; C23F 1/10; C23F 1/28
See application file for complete search history.

(56) References Cited

U.S. PATENT DOCUMENTS

| 3,825,419 A | 7/1974 | Chen |
| 4,008,076 A | 2/1977 | Junghanss et al. |

(Continued)

FOREIGN PATENT DOCUMENTS

| JP | H04126061 A | 4/1992 |
| WO | 2007/042920 A1 | 4/2007 |

OTHER PUBLICATIONS

U.K. Examination Report dated Jun. 13, 2017, for U.K. Application No. 1511885.4 (5 p.).
(Continued)

*Primary Examiner* — Pegah Parvini
(74) *Attorney, Agent, or Firm* — Conley Rose, P.C.

(57) ABSTRACT

A method for leaching a PCD table for a cutter element includes (a) positioning a PCD table within a leaching chamber. The method also includes (b) submerging the PCD table in an acid within the leaching chamber. In addition, the method includes (c) sealing the leaching chamber. Further, the method includes (d) increasing the pressure within the leaching chamber to a pressure greater than or equal to 20,000 psi after (c).

17 Claims, 10 Drawing Sheets

(51) Int. Cl.
*B24D 18/00* (2006.01)
*C23F 1/10* (2006.01)
*C23F 1/08* (2006.01)
*C23F 1/28* (2006.01)
*B01J 19/24* (2006.01)
*B24D 99/00* (2010.01)

(52) U.S. Cl.
CPC ............... *C23F 1/08* (2013.01); *C23F 1/10* (2013.01); *C23F 1/28* (2013.01); *E21B 10/567* (2013.01); *B01J 2219/00162* (2013.01); *B01J 2219/24* (2013.01)

(56) References Cited

U.S. PATENT DOCUMENTS

| | | |
|---|---|---|
| 4,011,091 A | 3/1977 | McCollister |
| 4,942,750 A | 7/1990 | Conaway |
| 5,765,465 A | 6/1998 | Gardin et al. |
| 6,379,637 B1 | 4/2002 | Curlook |
| 7,712,553 B2 | 5/2010 | Shamburger |
| 7,972,395 B1 | 7/2011 | Dadson |
| 8,002,859 B2 | 8/2011 | Griffo et al. |
| 2007/0169419 A1 | 7/2007 | Davis et al. |
| 2008/0185189 A1 | 8/2008 | Griffo et al. |
| 2008/0286182 A1 | 11/2008 | Costa et al. |
| 2010/0095602 A1 | 4/2010 | Belnap et al. |
| 2011/0048172 A1 | 3/2011 | Schlienger et al. |
| 2011/0212303 A1 | 9/2011 | Fuller et al. |
| 2012/0151847 A1 | 6/2012 | Ladi et al. |
| 2012/0227332 A1 | 9/2012 | Belnap et al. |
| 2013/0340352 A1 | 12/2013 | Eve |

OTHER PUBLICATIONS

International Application No. PCT/US2013/078247 Search Report and Written Opinion dated Nov. 12, 2014 (12 pages).
Yagishita, Teruo, et al., "Cleaning of Copper Surface Using Vapor-Phase Organic Acids," Association of Super-Advanced Electronics Technologies (ASET), Japan, Proceedings of the Symposium on Semiconductors and Integrated Circuits Technology, vol. 65, pp. 54-57 (2003) (1 p.).
U.K. Examination Report dated Sep. 5, 2017, for U.K. Application No. 1511885.4 (3 p.).

FIG. 11

APPARATUS AND METHODS FOR HIGH PRESSURE LEACHING OF POLYCRYSTALLINE DIAMOND CUTTER ELEMENTS

CROSS-REFERENCE TO RELATED APPLICATIONS

This application is a 35 U.S.C. § 371 national stage application of PCT/US2013/078247 filed Dec. 30, 2013, and entitled "Apparatus and Methods for High Pressure Leaching of Polycrystalline Diamond Cutter Elements," which claims benefit of U.S. provisional patent application Ser. No. 61/747,586 filed Dec. 31, 2012, and entitled "Apparatus and Methods for High Pressure Leaching of Polycrystalline Diamond Cutter Elements," each of which is hereby incorporated herein by reference in its entirety.

STATEMENT REGARDING FEDERALLY SPONSORED RESEARCH OR DEVELOPMENT

Not applicable.

BACKGROUND

The invention relates generally to rotary drill bits for drilling boreholes in a subterranean formation. More particularly, the invention relates to systems and methods for leaching Polycrystalline Diamond ("PCD") cutter elements to enhance their mechanical properties.

Oil and gas drilling operations often employ fixed cutter drill bits to drill through various rock formations in an effort to access hydrocarbon reserves below the ground. Fixed cutter drill bits employ a plurality of cutter elements that engage, scrape, and shear the earthen formation being drilled through. Such cutter elements are typically made of a layer or table of Polycrystalline Diamond ("PCD") bonded to a cobalt cemented, tungsten carbide (WC) substrate.

To manufacture a PCD table for a cutter element and bond the table to the substrate, diamond powder is placed at the bottom of a first mold or can along with a catalyst. The substrate is then placed within the first mold on top of the diamond powder, a second mold or can is placed on top of the substrate, and a seal is formed between the first and second cans. This entire assembly is then subjected to high pressure and temperature conditions to form the PCD cutter element. In general, any Group VIII element (e.g., cobalt, nickel, or iron) can be used as the catalyst, however, in most cases, cobalt (Co) is employed. The high pressure and temperature conditions drive the catalyst into the interstitial spaces between the diamond grains and promotes intergrowth, thereby forming a solid PCD table suitable for use in a cutter element. The high pressure and temperature conditions also facilitate bonding between the newly formed PCD table and the substrate, thereby resulting in a fully formed PCD cutter element.

During drilling operations, cutter elements experience relatively high temperatures due, at least in part, to the general nature of the downhole environment and friction between the cutter elements and the formation. The thermal loads result in expansion of the material components of the cutter elements. Due to differences in the coefficients of thermal expansion between the catalyst and the diamond grains in the PCD table, at sufficiently high temperatures undesirable cracks may form in the PCD lattice structure of the table. Such cracks can lead to failure of the cutter element, reduced cutting efficiency, and reduced cutting effectiveness. Additionally, high thermal loads can also lead to the formation of materials such as, for example, carbon monoxide, carbon dioxide, or graphite within the PCD table itself, which can further reduce the effectiveness and strength of the cutter element. Accordingly, it is desirable to remove at least a portion of the catalyst from a PCD table after its formation to enhance cutter element durability over a broader range of operating temperatures.

A common approach to remove the catalyst from a PCD table is to leach the PCD table to remove some or substantially all of the interstitial catalyst from the PCD lattice structure, thereby transforming the PCD table into thermally stable polycrystalline diamond. Leaching typically involves placing the cutter element in a strong acid bath at an elevated temperature to expose the PCD table to the acid. Suitable acids for leaching include nitric acid, sulfuric acid, hydrofluoric acid, hydrochloric acid, and combinations thereof. Conventional leaching processes typically require large amounts of time in order to allow the leaching acid to remove the desired amount of catalyst from a given PCD table. In some cases, a PCD cutter element must remain within the leaching acid for up to three weeks in order to obtain the desired result. This relatively long time requirement reduces the flexibility available in manufacturing PCD cutter elements, thereby increasing the costs associated therewith.

BRIEF SUMMARY OF THE DISCLOSURE

These and other needs in the art are addressed in one embodiment by a method for leaching a PCD table for a cutter element. In an embodiment, the method comprises (a) positioning a PCD table within a leaching chamber. In addition, the method comprises (b) submerging the PCD table in an acid within the leaching chamber. Further, the method comprises (c) sealing the leaching chamber. Still further, the method comprises (d) increasing the pressure within the leaching chamber to a pressure greater than or equal to 20,000 psi after (c).

These and other needs in the art are addressed in another embodiment by an apparatus for leaching a PCD table for a cutter element. In an embodiment, the apparatus comprises an outer pressure vessel including a body and a cap removably secured to an upper end of the body. In addition, the apparatus comprises a leaching assembly disposed within the outer pressure vessel. The leaching assembly includes an outer housing and a plunger moveably disposed within the outer housing.

These and other needs in the art are addressed in another embodiment by a method for leaching a PCD table for a cutter element. In an embodiment, the method comprises (a) positioning a PCD table within a leaching chamber disposed within a housing. The leaching chamber is at least partially filled with an acid. In addition, the method comprises (b) positioning the housing within an inner chamber of a pressure vessel. Further, the method comprises (c) sealing the leaching chamber from the inner chamber. Still further, the method comprises (d) increasing the pressure within the inner chamber. Moreover, the method comprises (e) increasing the pressure within the leaching chamber during (d) to a pressure greater than or equal to 20,000 psi.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. As used herein, the word "approximately" means "plus or minus 10%."

Figure 1:
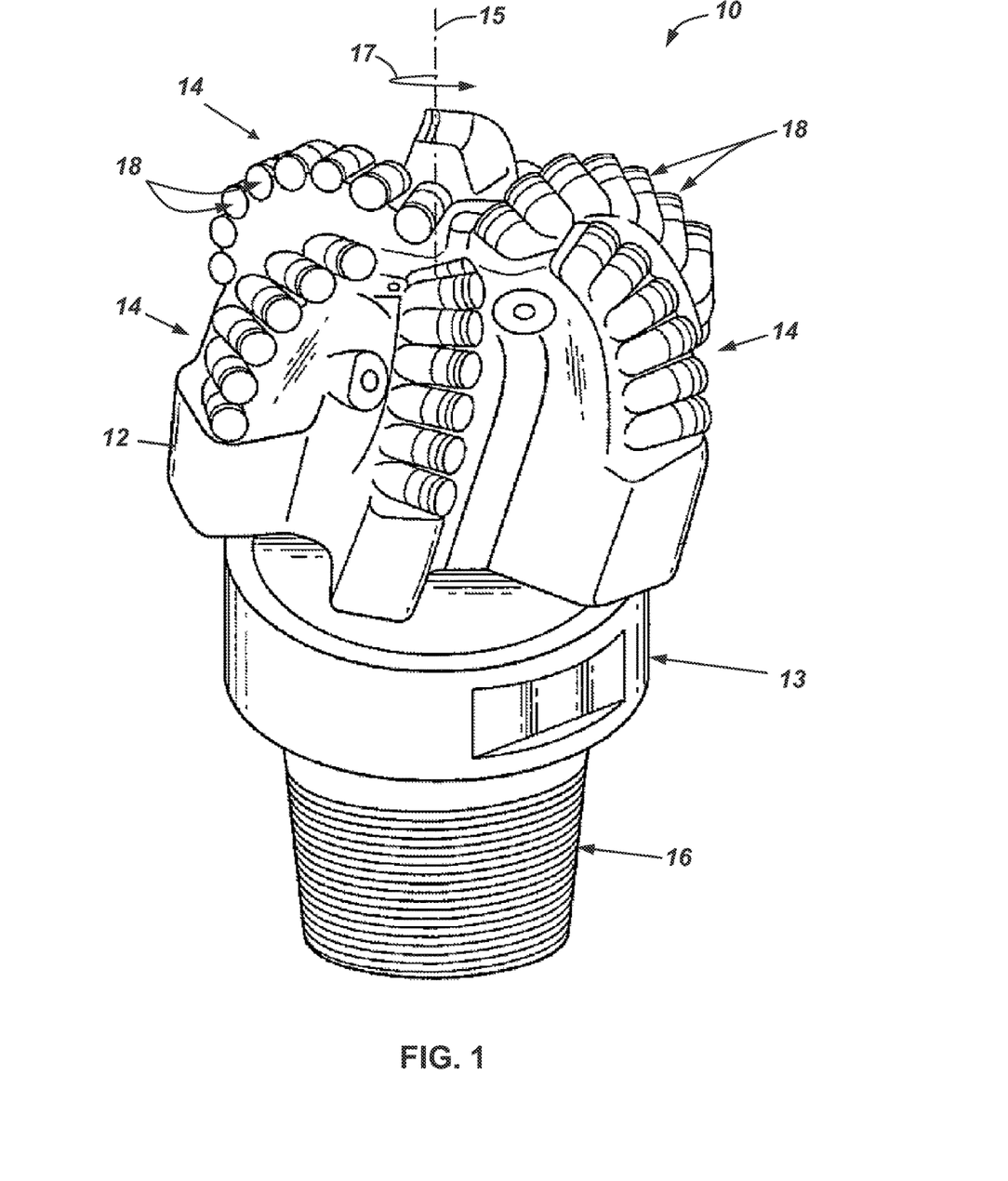
FIG. 1 is perspective view of an embodiment of a fixed cutter drill bit employing PCD cutter elements manufactured in accordance with the principles described herein.

Referring now to FIG. 1, an embodiment of a fixed cutter drill bit 10 is shown. Drill bit 10 has a bit body 12, a shank 13, a threaded pin end 16, and a central longitudinal axis 15 about which bit 10 is rotated in a cutting direction 17. Bit 10 also includes a plurality of blades 14 running along the outside of body 12 which generally extend radially outward from the axis 15. A plurality of cutter elements 18 manufactured in accordance with the principles described herein are disposed side-by-side along each blade 14 such that each cutter element 18 on a given blade 14 faces the same general direction (i.e., aligned with cutting direction 17). During operation, bit 10 is disposed on the end of a drill string (not shown) via threaded pin end 16, and weight-on-bit ("WOB") is applied to force bit 10 against a rock formation. Bit 10 is rotated about axis 15 in the cutting direction 17, and with WOB applied, cutter elements 18 engage the formation and scrape and shear portions thereof. As chips of the formation are broken off and transported to the surface with drilling mud, bit 10 is allowed to advance further into the rock formation along a predetermined trajectory.

Figure 2:
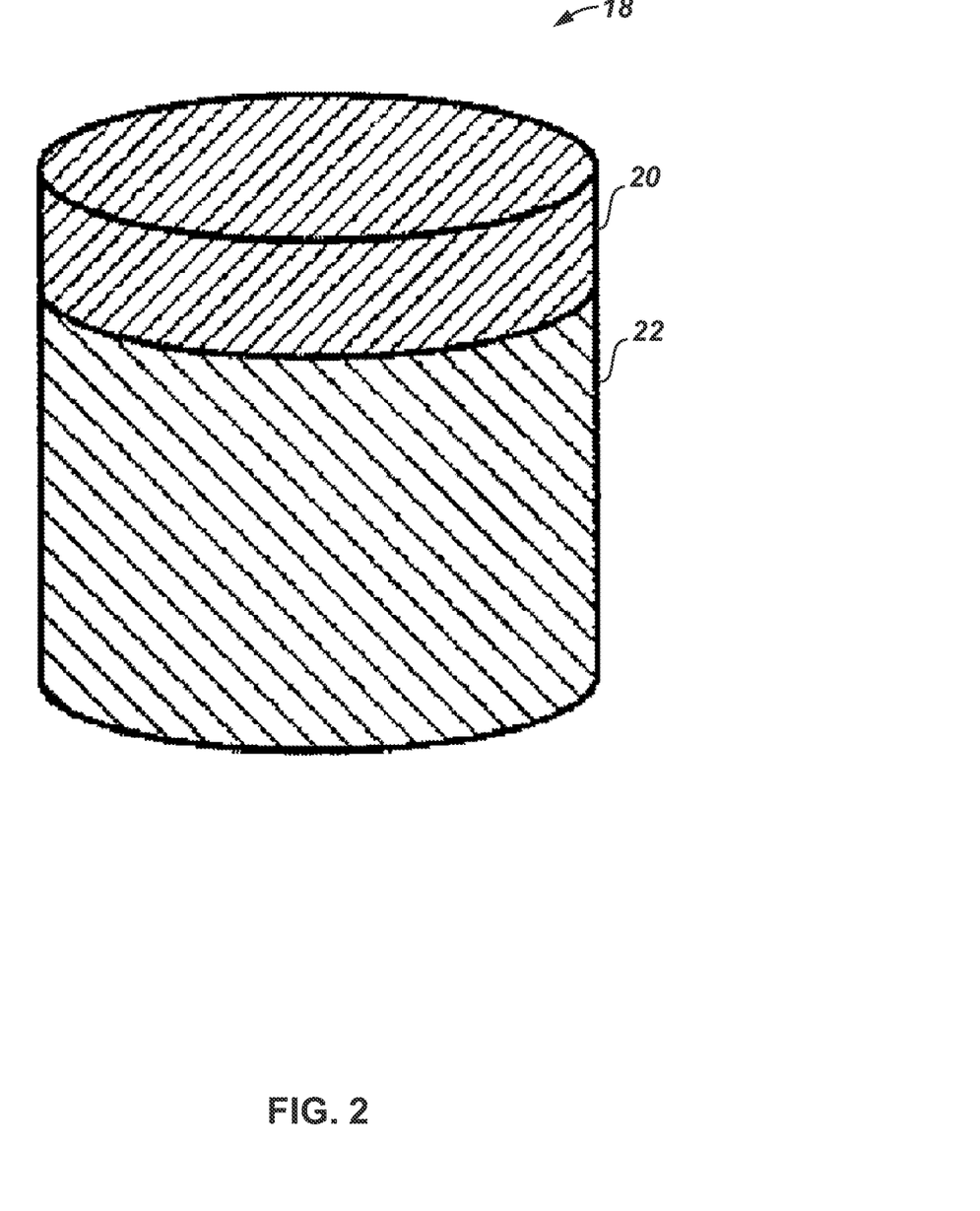
FIG. 2 is an enlarged perspective view of one PCD cutter element of the drill bit of FIG. 1.

Referring now to FIG. 2, one cutter element 18 is shown, it being understood that each cutter element 18 provided on bit 10 is the same. Specifically, each cutter element 18 includes a polycrystalline diamond ("PCD") layer or table 20 mounted to a tungsten carbide support member or substrate 22. Cutter element 18 is formed in a conventional "sintering" process. Namely, substrate 22 is placed on top of diamond grains and a catalyst such as Co or other Group VIII element within a mold, also referred to as a can. The diamond grains, catalyst, and substrate 22 are then subjected to high pressure and high temperature conditions to simultaneously form the solid PCD table 20 and bond the PCD table 20 to substrate 22. During the above described process, the diamond grains form a matrix of diamond crystals with catalyst disposed at several of the interstices.

As previously described, it is often desirable to remove all or some of the catalyst from the PCD table 20 via leaching. Conventionally, leaching is performed by placing the cutter element (e.g., cutter element 18) in a liquid bath of leaching acid (e.g., nitric acid, sulfuric acid, hydrofluoric acid, hydrochloric acid, or some combination thereof) for an extended period of time. However, as previously described, such conventional leaching processes typically require long periods of time (e.g., weeks) to sufficiently reduce the amount of catalyst present in the lattice structure of the PCD table. Accordingly, in embodiments described herein, systems and methods for ultra-high pressure leaching of PCD cutter elements (e.g., cutter elements 18) offer the potential to reduce the total amount of time necessary to remove a sufficient amount of catalyst from the lattice structure of the PCD table as compared to conventional acid bath leaching techniques.

Figure 3:
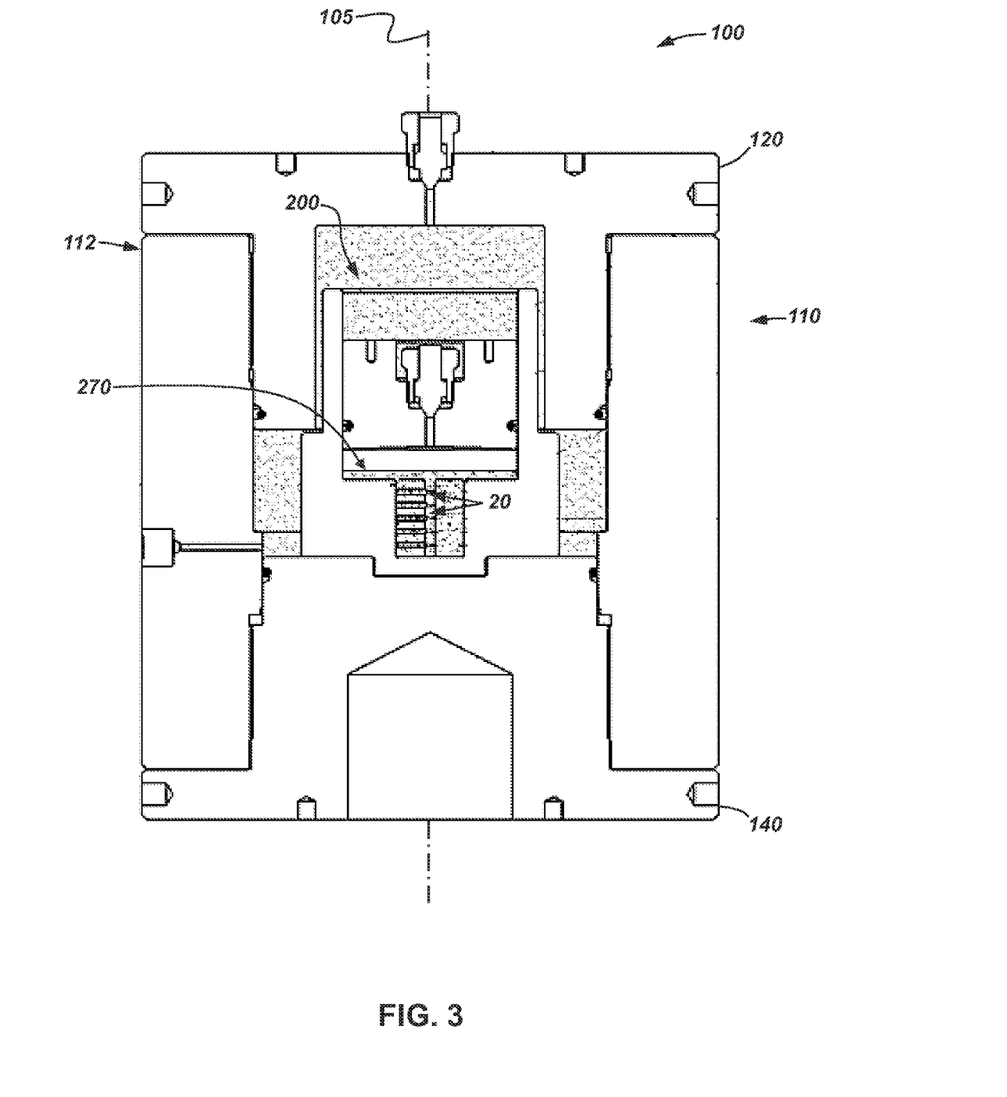
FIG. 3 is a schematic partial cross-sectional view of a pressure vessel assembly for ultra-high pressure leaching one or more PCD tables in accordance with the principles disclosed herein.

Referring now to FIG. 3, an embodiment of an apparatus 100 for ultra-high pressure leaching one or more PCD tables 20 is shown. In this embodiment, apparatus 100 includes an outer pressure vessel or can 110 and an inner leaching assembly 200 disposed within can 110. In this embodiment, can 110 has a central or longitudinal axis 105 and comprises an outer housing or body 112, a first or upper cap 120 removably secured to body 112, and a second or lower cap 140 removably secured to body 112 opposite the upper cap 120. Leaching assembly 200 is positioned within body 112 between caps 120, 140.

Figure 4:
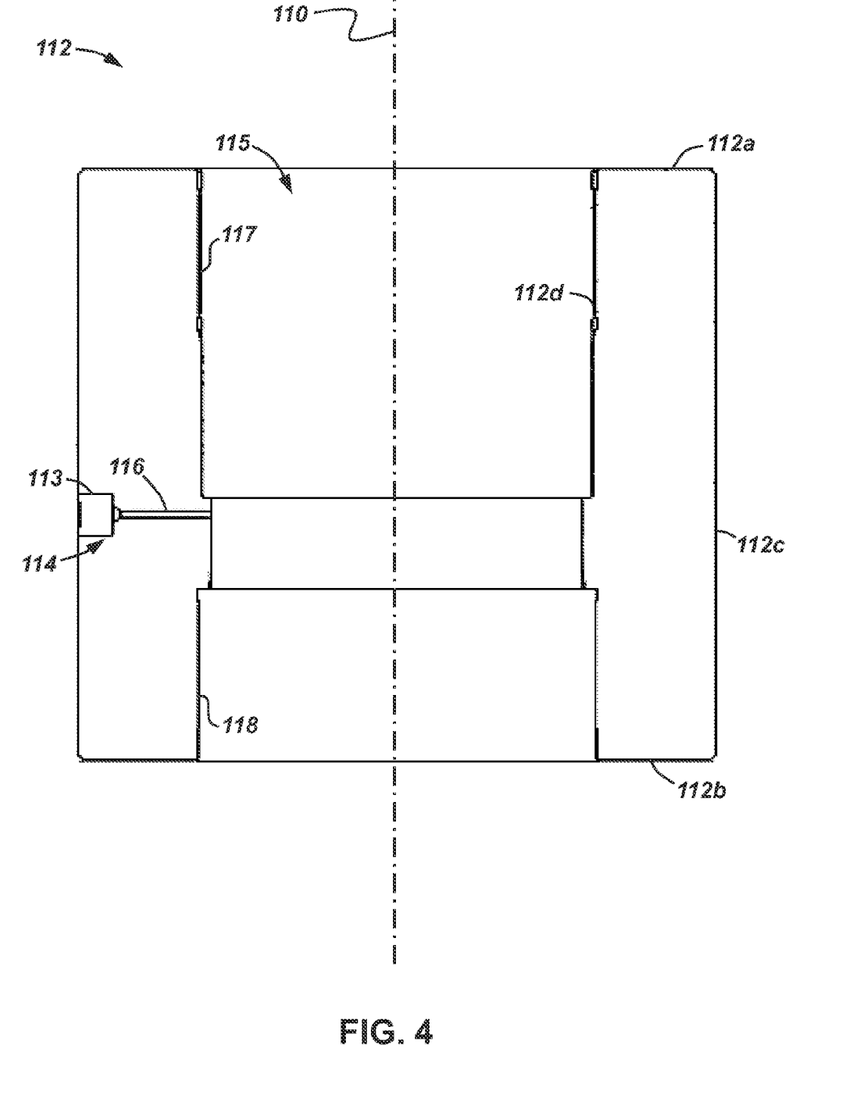
FIG. 4 is a cross-sectional view of the body of FIG. 3.

Referring now to FIGS. 3 and 4, body 112 has a central axis 110 coaxially aligned with the axis 105 when apparatus 100 is fully assembled, a first or upper end 112a, a second or lower end 112b, a generally cylindrical radially outer surface 112c extending axially between ends 112a, b, a generally cylindrical radially inner surface 112d extending axially between ends 112a, b, and an inner cavity or chamber 115 defined by the inner surface 112d. The inner surface 112d includes a first set of internal threads 117 axially adjacent the upper end 112a, a second set of internal threads 118 axially adjacent the lower end 112b, and an access port 114 extending radially through body 112 from outer surface 112c to inner surface 112d. Access port 114 includes a connection receptacle 113 extending radially inward from the outer surface 112c and a channel 116 extending radially outward from the inner surface 112d to connection receptacle 113, thereby providing an access flow path from the outer surface 112c to the chamber 115. In some embodiments, access port 114 also includes a valve (not shown) that is actuatable to prevent fluid migration through access port 114, during operation.

Figure 5:
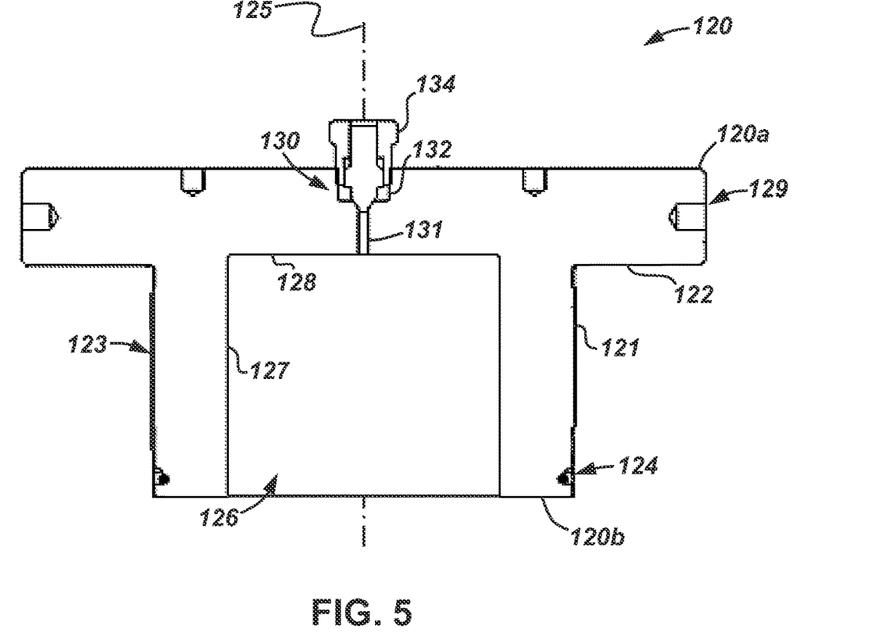
FIG. 5 is a cross-sectional view of the upper cap of FIG. 3.

Referring now to FIGS. 3 and 5, upper cap 120 has a central axis 125 coaxially aligned with axis 105 of vessel 110 when secured to body 112, a first or upper end 120a, and a second or lower end 120b opposite the upper end 120a. Upper end 120a includes an annular flange 129 that defines an annular shoulder 122. Upper cap 120 has a generally cylindrical outer surface 121 extending axially from flange 129 to lower end 120b; outer surface 121 includes external threads 123. An annular seal 124 is positioned along the outer surface 121 proximal the lower end 120b. As will be described in more detail below, annular seal 124 prevents fluids from migrating between the body 112 and the upper cap 120. In this embodiment, seal 124 comprises an O-ring seal seated in an annular gland in surface 121, however, in general, any suitable sealing means or device can be employed between upper cap 120 and body 112 while still complying with the principles disclosed herein.

A cylindrical counterbore or recess 126 extends axially from lower end 120b and is coaxially aligned with axis 125. Recess 126 is defined by a cylindrical wall 127 and a substantially planar surface 128. An access port 130 extends axially from the upper end 120a to recess 126. Access port 130 includes a channel 131 extending axially from the planar surface 128 and a connection receptacle 132 extending axially from the upper end 120a to the channel 131. A plug 134 is seated within and sealingly engages the receptacle 132, such that fluids may not migrate into or out of the chamber 115 (FIG. 4) through the access port 130. In other embodiments, the plug 134 is replaced with a pressure gauge that measures the pressure differential between the inside of body 112 and the surrounding environment.

Figure 6:
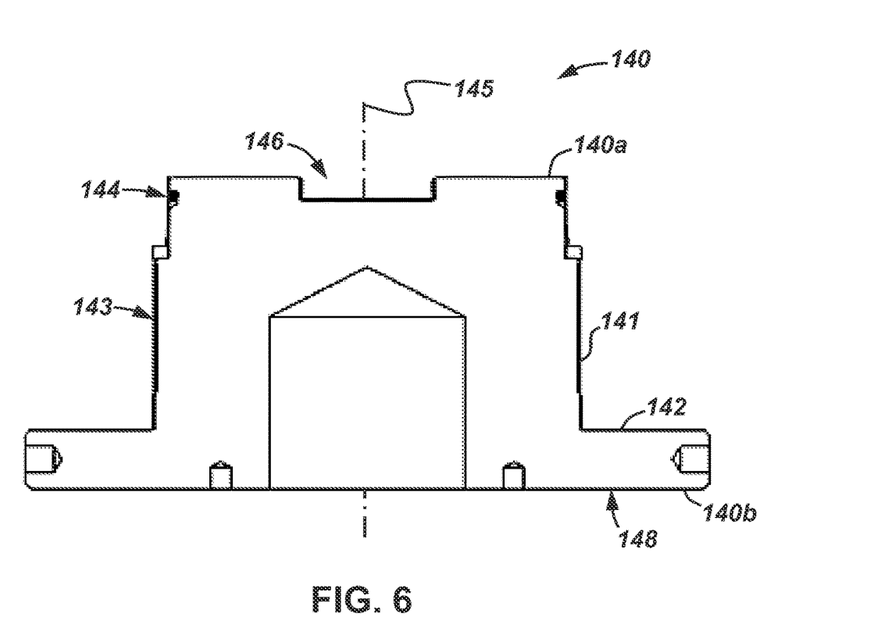
FIG. 6 is a cross-sectional view of the lower cap of FIG. 3.

Referring now to FIGS. 3 and 6, lower cap 140 has a central axis 145 coaxially aligned with axis 105 of vessel 110 when secured to body 112, a first or upper end 140a, and a second or lower end 140b opposite the upper end 140a. Upper end 140a includes a cylindrical counterbore or recess 146 coaxially aligned with the central axis 145. Lower end 140b comprises an annular flange 148 defining an annular shoulder 142. Lower cap 140 has a generally cylindrical outer surface 141 extending axially from flange 148 to upper end 140b; outer surface 141 includes external threads 143. An annular seal 144 is positioned along the outer surface 141 proximal the upper end 140a. As will be described in more detail below, annular seal 144 prevents fluids from migrating between body 112 and lower cap 140 when cap 140 is secured thereto. In this embodiment, seal 144 comprises an O-ring seal seated in an annular gland in surface 141, however, in general, any suitable sealing means or device can be employed between lower cap 140 and body 112 while still complying with the principles disclosed herein.

Figure 7:
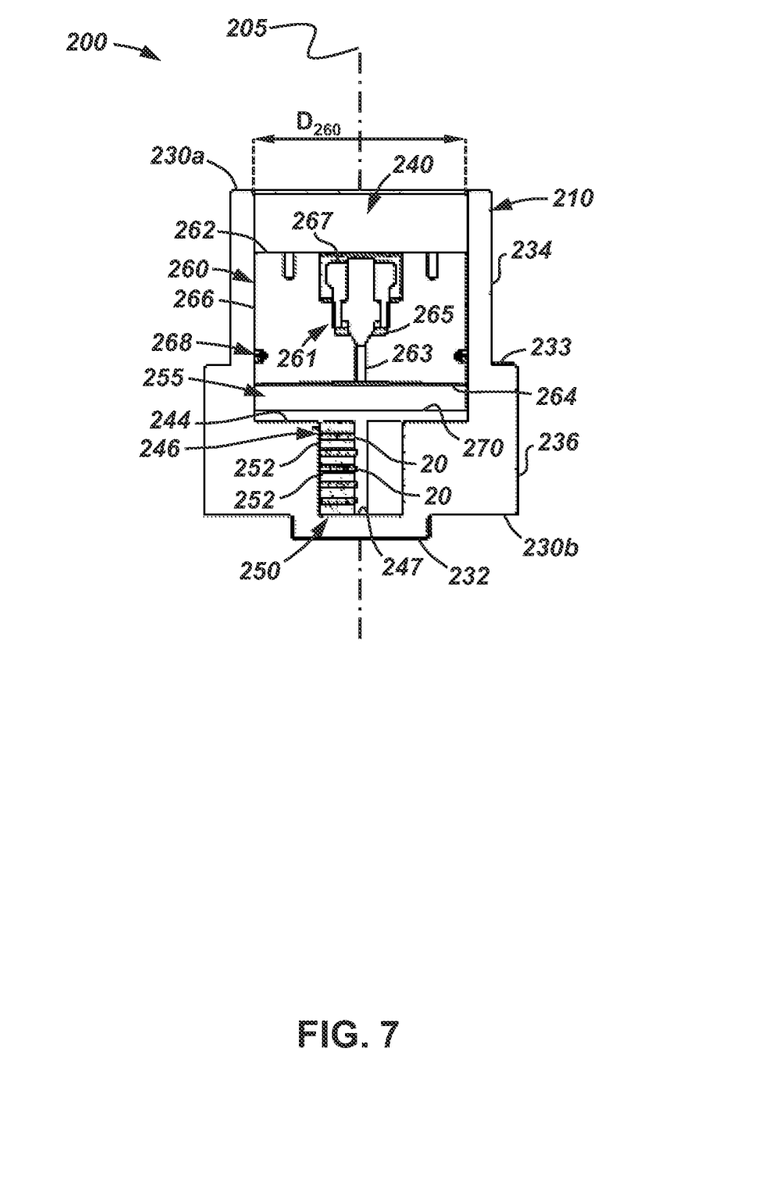
FIG. 7 is a cross-sectional view of the leaching assembly of FIG. 3.

Referring now to FIGS. 3 and 7, leaching assembly 200 includes an outer housing 210, a plunger 260 moveably disposed in housing 210, and a leaching shelf 250 for holding a plurality of PCD tables 20. Housing 210 has a central or longitudinal axis 205 coaxially aligned with the central longitudinal axis 105 of the vessel 110 when disposed therein, a first or upper open end 230a, and a second or lower closed end 230b opposite the upper end 230a. Lower end 230b includes a cylindrical projection 232 extending axially from the lower end 230b. As will be described in more detail below, projection 232 engages with recess 146 (FIG. 6) when leaching chamber 200 is installed within vessel 110. In addition, housing 210 has a radially outer surface including a first or upper outer cylindrical wall 234 extending axially from upper end 230a and a second or lower cylindrical wall 236 axially adjacent wall 234. Upper wall 234 is disposed at radius that is less than the radius of lower wall 236, thereby forming an annular shoulder 233 extending radially between walls 234, 236.

A first or upper cylindrical counterbore or recess 240 extends axially from the upper end 230a to an annular shoulder 244, and a second or lower cylindrical counterbore or recess 246 extends axially from the shoulder 244 and upper recess 240 to a planar surface 247. Leaching shelf 250 is disposed within the lower recess 246 and comprises a plurality of slots 252 each configured to house and secure at least one PCT table 20 therein. Although slots 252 on leaching shelf 250 are described as holding PCD tables 20, in general, slots 252 can be sized to hold a plurality of individual PCT tables 20 and/or a plurality of PCD cutter elements 18 including PCD tables 20.

Plunger 260 is disposed within the upper recess 240 and slidingly engages housing 210. In particular, plunger 260 has a first or upper planar side or surface 262, a second or lower planar side or surface 264 opposite the upper planar surface 262, and a cylindrical surface 266 extending axially between the upper planar surface 262 and the lower planar surface 264. Plunger 260 has an outer diameter $D_{260}$ defined by outer surface 266. Outer diameter $D_{260}$ is substantially the same as the inner diameter of the upper recess 240, thereby enabling sliding engagement therebetween. An annular seal 268 is disposed along the cylindrical surface 266 and prevents fluids from migrating between the plunger 260 and the body 210. In this embodiment, seal 268 is an O-ring seal seated in an annular gland in surface 266, however, in general, any suitable sealing means or device can be employed between plunger 260 and housing 210 while still complying with the principles disclosed herein. When plunger 260 is installed within the upper recess 240, a leaching chamber 255 is formed between the plunger 260 and the planar surface 247. As will be described in more detail below, during leaching operations, the leaching chamber 255 is filled with an acid 270 in order to leach one or more PCD tables 20.

An access port 261 extends axially through plunger 260, and includes a channel 263 extending axially from the lower planar surface 264 and a connection receptacle 265 extending axially from the upper planar surface 262 to the channel 263, thereby defining a flow path through plunger 260 from the upper planar surface 262 to the leaching chamber 255. A plug 267 is installed within and sealingly engages the receptacle 265 such that fluids may not migrate through the access port 261.

Referring now to FIGS. 3-7, each component of vessel 110 is preferably made of a durable, rigid material that is resistant to the acids typically used during leaching processes. In this embodiment, each of the components making up vessel 110 (e.g., upper cap 120, lower cap 140, body 112, leaching assembly 200, etc.) is made of a HASTELLOY® alloy. In addition, in this embodiment, each of the components is coated with polytetrafluoroethylene (PTFE) or Teflon®.

Figure 8:
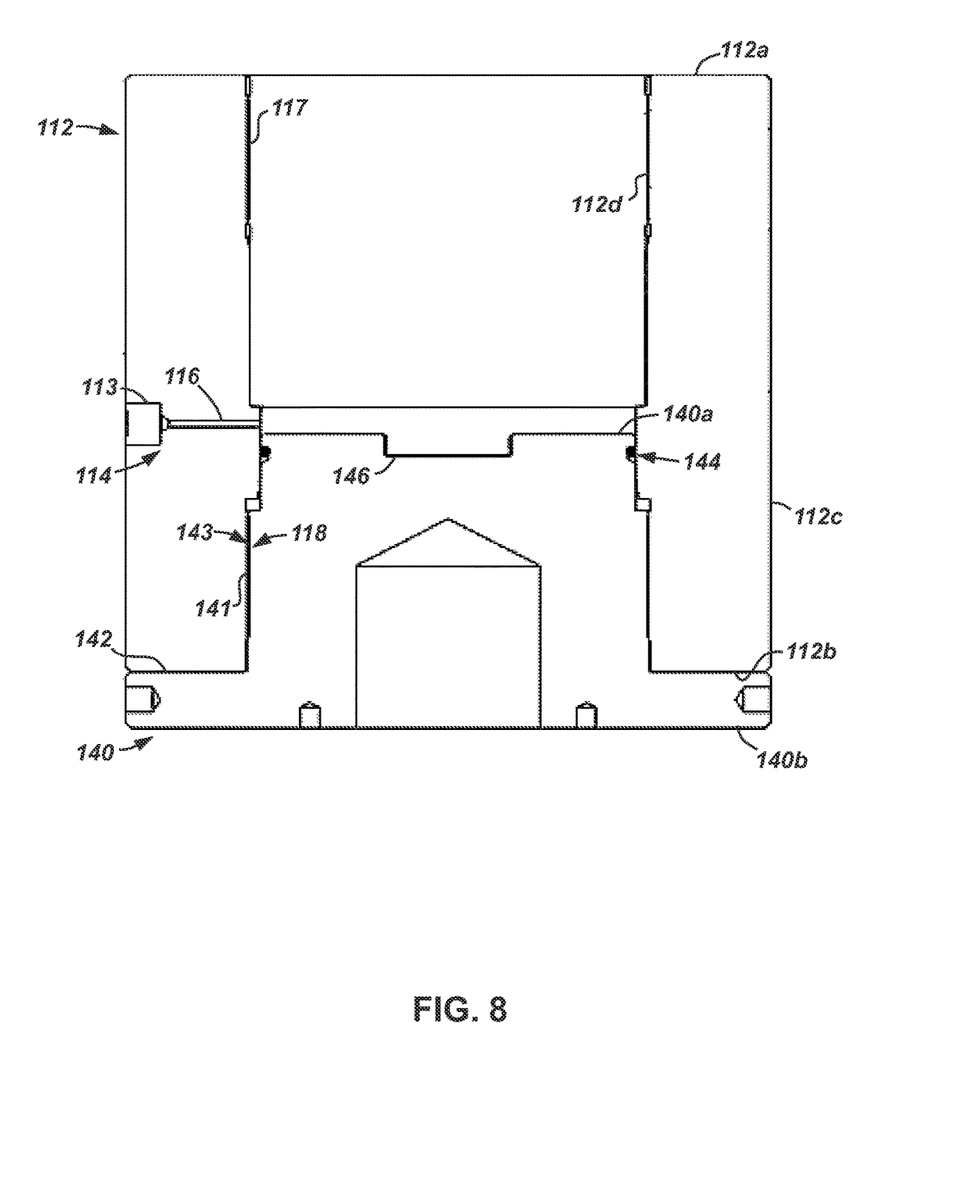
FIGS. 8-10 are sequential cross-sectional views illustrating the assembly of the pressure vessel assembly of FIG. 3.
Figure 9:
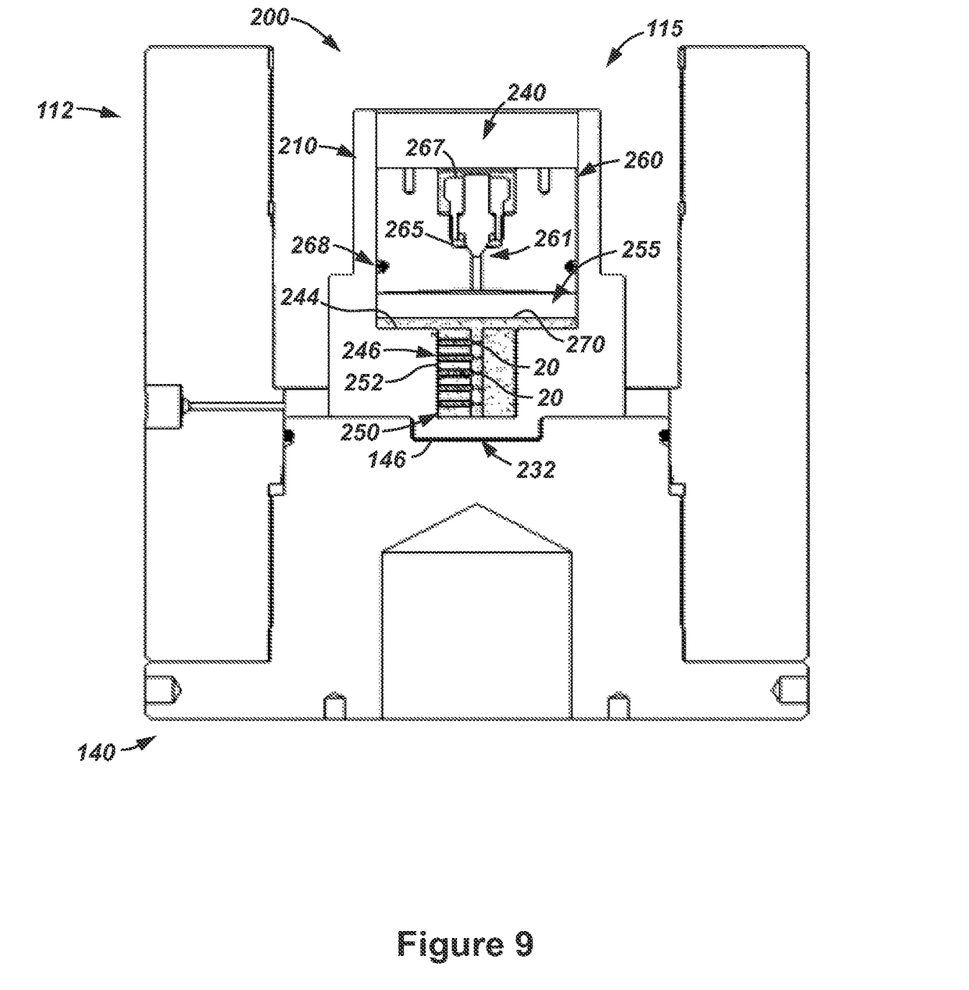
Figure 10:
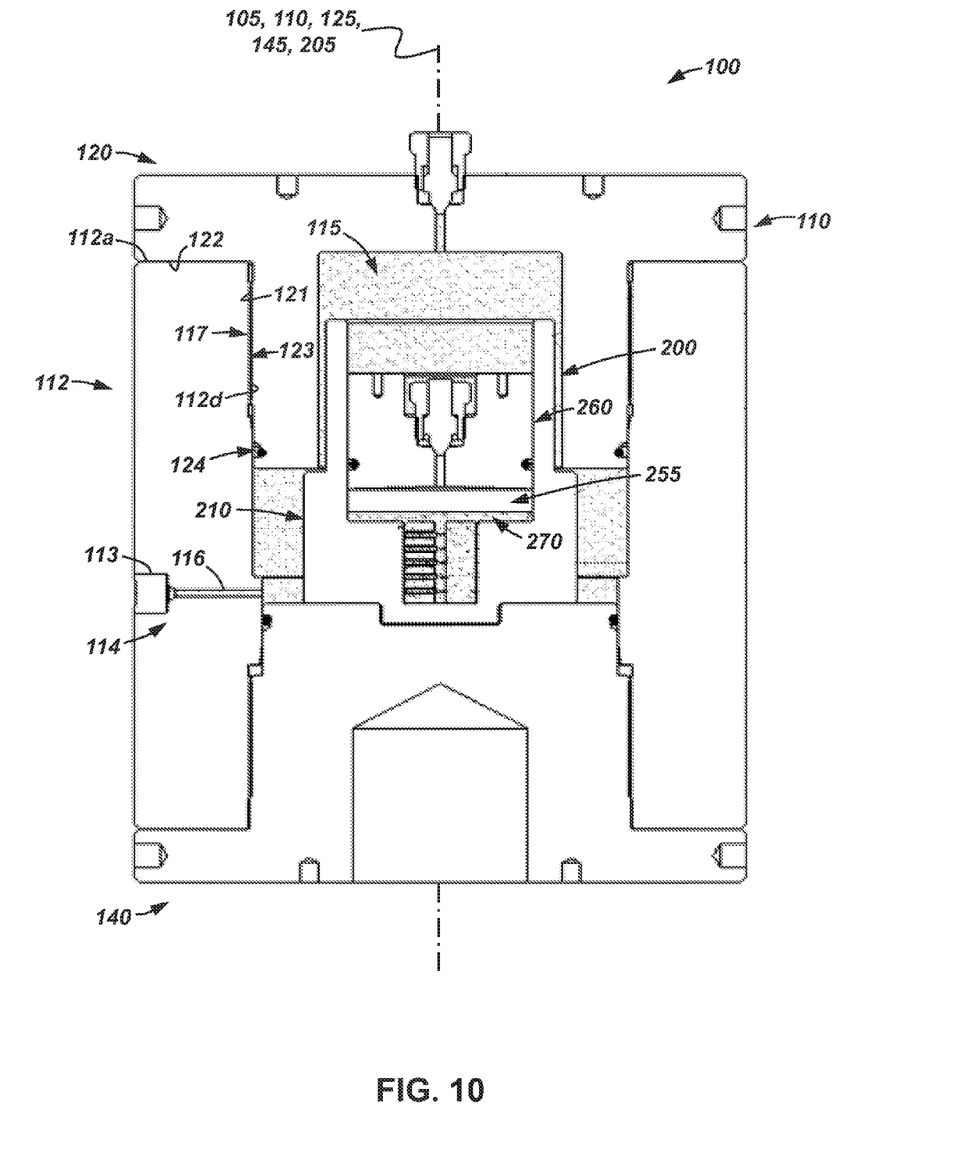

Referring now to FIGS. 8-10, the assembly of apparatus 100 and leaching operations are shown. Referring first to FIG. 8, the lower cap 140 is threadably secured to body 112. In particular, the lower cap 140 is first secured to the body 112 by engaging external threads 143 on surface 141 with internal threads 118 on surface 112d, until the lower end 112b axially abuts the shoulder 142. As the lower cap 140 is being secured to the body 112, the annular seal 144 is formed between the body 112 and the lower cap 140.

Next, as shown in FIG. 9, the leaching assembly 200, with leaching shelf 250 and PCD tables 20 disposed therein, is positioned within the chamber 115. In particular, leaching assembly housing 210 is positioned within the chamber 115 such that the projection 232 engages with the mating recess 146 on the upper end 140a of lower cap 140. PCD tables 20 are then installed within the slots 252 of the leaching shelf 250, and the shelf 250 is installed within the lower recess 246 of the leaching assembly housing 210. Thereafter, a leaching acid 270, such as nitric acid, sulfuric acid, hydrofluoric acid, hydrochloric acid, or some combination thereof, is placed within the leaching assembly housing 210 such that the PCD tables 20 housed within the leaching shelf 250 are completely submerged within the acid 270. In some embodiments, the acid 270 is placed within the leaching assembly housing 210 first, and then the leaching shelf 250, with tables 20 installed therein, is placed within the acid 270.

Next, the plug 267 is removed from receptacle 265 on access port 261 on the plunger 260 such that fluids may freely flow through the access port 261, and the plunger 260 is placed within the upper recess 240, thereby forming annular seal 268 between plunger 260 and housing 210. The plunger 260 is then forced axially downward or toward the annular shoulder 244 within the upper recess 240 such that any air within the leaching chamber 255 is forced axially upward through the access port 261. Once all or substantially all of the air has been displaced from the leaching chamber 255, the plug 267 is reinstalled thereby preventing further migration of fluid through the access port 261.

Referring now to FIG. 10, the upper cap 120 is threadably secured to the upper end 112a of body 112 by engaging the external threads 123 on surface 121 with the internal threads 117 on the surface 112d until the upper end 112a of body 112 engages with and abuts shoulder 122. As the upper cap 120 is being secured to the body 112, the annular seal 124 is formed between the body 112 and the upper cap 120. Thereafter, a pressurizing fluid, such as air, water, or nitrogen is pumped or forced into the chamber 115 via the access port 114. For example, a pump or compressor can be coupled to the connection receptacle 113 to supply pressurized fluid to chamber 115. Similar to a piston, the plunger 260 moves within recess 240 in response to a pressure differential between chambers 115, 255. Thus, as the pressure within the chamber 115 rises, the plunger 260 is forced axially downward within the upper recess 240 until the pressure in chambers 115, 255 is equalized. Once the pressure within the chamber 115, and hence the pressure in leaching chamber 255, reaches a desired level, the access port 114 is closed by a plug or valve (not shown). In some embodiments, this valve may be remotely actuated. In still other embodiments, this valve may trigger automatically once the desired pressure is achieved.

In general, the desired pressure within the leaching chamber 255 will depend on a variety of factors including, without limitation, the type of leaching acid 270 being used and the amount of catalyst being removed from PCD tables 20. As a result, the specific pressure in the leaching chamber 255 may vary. For most applications, the pressure within the leaching chamber 255 is preferably between 20,000 and 35,000 psi, and more preferably about 30,000 psi. Increasing the pressure to such a high level offers the potential to accelerate the leaching process by forcing the acid (e.g., acid 270) into the interstices of the PCD lattice structure, thereby allowing the acid to more efficiently dissolve the catalyst disposed therein. In some embodiments, the temperature within the leaching chamber 255 is also increased such as, for example, by wrapping the vessel 110 in a heating element, to further accelerate leaching of the PCD tables 20.

Upon completion of the leaching process, the upper cap 120 is removed, thereby eliminating the pressure differential between the chamber 115 and the outside environment. During typical leaching operations, hydrogen gas is produced from the acid (e.g., acid 270) as a byproduct. Thus, the dimensions of the apparatus 100, particularly the plunger 260 and the leaching assembly housing 210, are chosen to adequately contain the expected volume of hydrogen gas produced by the acid 270 within the leaching chamber 255. However, the production of hydrogen gas may exceed expected levels and therefore lead to a pressure buildup within the leaching chamber 255. This pressure may cause the plunger 260 to be ejected from the leaching chamber housing 210 when the upper cap 120 is removed from the vessel 110. Thus, as a fail-safe, in this embodiment seal 268 is positioned, and the upper cap 120, the body 112, and the housing 210 are all sized such that the seal 268 between the plunger 260 and the housing 210 is broken when the upper cap 120 is partially unthreaded from the body 112. Once the seal 268 is disengaged, the pressure within the leaching chamber 255 will fall to atmospheric conditions, thereby eliminating the threat posed by ejection of the plunger 260.

Figure 11:
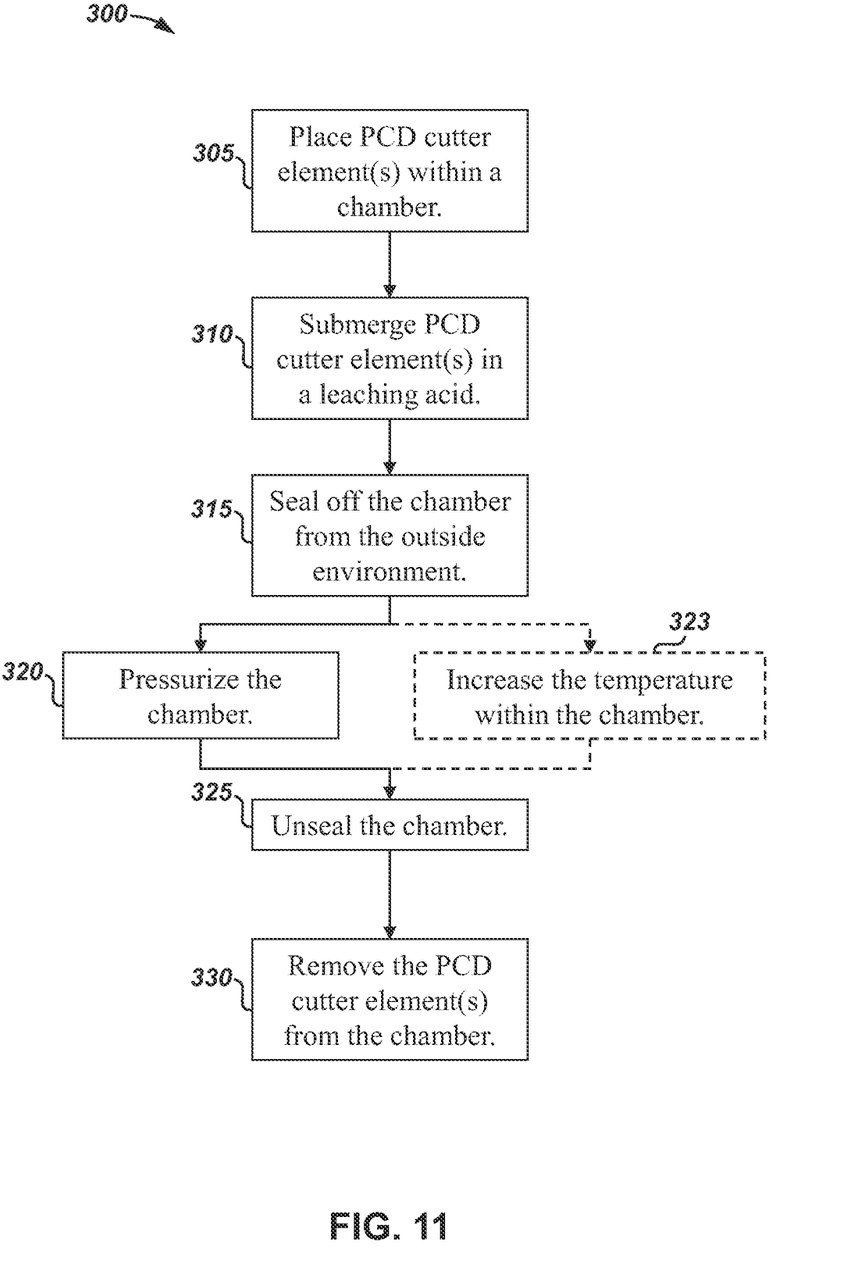
FIG. 11 is a graphical illustration of an embodiment of a method for leaching a PCD cutter element using the pressure vessel assembly of FIG. 3 in accordance with the principles disclosed herein.

Referring now to FIG. 11, an embodiment of a method 300 for ultra-high pressure leaching of a PCD cutter element (e.g., cutter element 18) is shown. Although method 300 is described as being performed with apparatus 100 previously described, it should be appreciated that method 300 can be performed with other suitable devices and assemblies. Beginning in block 305, one or more PCD tables (e.g., PCD tables 20 or cutter elements 18 including PCD tables 20) are placed within a chamber (e.g., chamber 115). Next, at block 310, the PCD tables are submerged in a suitable leaching acid (e.g., acid 270). In block 315, the chamber housing the PCD tables and the acid is sealed off from the outside environment. Next, the sealed chamber is pressurized in block 320. The sealed chamber is preferably pressurized to a pressure between 20,000 to 35,000 psi, and more preferably about 30,000 psi. In addition, in this embodiment, method 300 also optionally includes increasing the temperature within the chamber at block 323 to a temperature less or equal to 600° C. Such elevated temperatures reduce the viscosity of the leaching acid, thereby allowing the acid to more easily penetrate the interstices of the PCD lattice structure. Once the leaching process is complete, the chamber is unsealed at block 325, and the PCD tables are removed from the chamber in block 330.

Embodiments of apparatus and methods for leaching the PCD tables of cutter elements at ultra-high pressures disclosed herein offer the potential to accelerate the leaching process. In particular, the time required to remove a desired amount of catalyst from the interstices of the PCD lattice structure may be reduced from a period of weeks to a period of days or even hours. As a result, embodiments described herein offer the potential to reduce the cost and time required to manufacture a PCD tables and associated cutter elements.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for leaching a PCD table for a cutter element, the method comprising:
   (a) positioning a PCD table within a leaching chamber, wherein the leaching chamber is disposed within a housing and has a volume defined by a plunger movably disposed within the housing;
   (b) submerging the PCD table in an acid within the leaching chamber;
   (c) moving the plunger within the housing to decrease the volume within the leaching chamber;
   (d) allowing air in the leaching chamber to flow from the leaching chamber through a channel extending through the plunger during (c);
   (e) sealing the leaching chamber; and
   (f) increasing the pressure within the leaching chamber to a pressure greater than or equal to 20,000 psi after (e).

2. The method of claim 1, wherein (f) comprises applying pressure to the acid with the plunger.

3. The method of claim 2, wherein (f) comprises:
   (f1) applying fluid pressure to a first side of the plunger; and
   (f2) engaging the acid with a second side of the plunger.

4. The method of claim 1, wherein the leaching chamber is disposed within a leaching assembly, and wherein the leaching assembly is disposed within an inner cavity of a pressure vessel;
   wherein (d) comprises increasing the pressure within the inner cavity of the pressure vessel.

5. The method of claim 1, further comprising:
   (g) increasing the temperature within the leaching chamber during (f).

6. The method of claim 1, wherein (f) comprises increasing the pressure within the leaching chamber to a pressure between 20,000 psi and 35,000 psi.

7. An apparatus for leaching a PCD table for a cutter element, comprising:
   an outer pressure vessel including a body and a cap removably secured to an upper end of the body;
   a leaching assembly disposed within the outer pressure vessel, wherein the leaching assembly includes an outer housing and a plunger moveably disposed within the outer housing, wherein the outer housing and the plunger define a leaching chamber;
   wherein the plunger includes a channel configured to selectively place the outer pressure vessel in fluid communication with the leaching chamber.

8. The apparatus of claim 7, wherein the body, the cap, the outer housing, and the plunger are each made of an acid resistant material.

9. The apparatus of claim 7, wherein the outer housing and the plunger is coated with polytetrafluoroethylene (PTFE) or Teflon®.

10. The apparatus of claim 7, wherein the leaching assembly further comprises a shelf removably disposed within the housing and configured to hold at least one PCD table.

11. The apparatus of claim 7, wherein the body includes an access port extending therethrough.

12. The apparatus of claim 7, wherein a lower end of the outer housing has a projection that is removably seated in a mating recess on an inner surface of the outer pressure vessel.

13. A method for leaching a PCD table for a cutter element, the method comprising:
   (a) positioning a PCD table within a leaching chamber disposed within a housing, wherein the leaching chamber is at least partially filled with an acid;
   (b) positioning the housing within an inner chamber of a pressure vessel, wherein the pressure vessel comprises an upper cap threadably attached to a body;
   (c) placing a plunger within the housing, wherein the plunger and the housing define the leaching chamber;
   (d) moving the plunger within the housing to decrease the volume within the leaching chamber;
   (e) allowing air in the leaching chamber to flow from the leaching chamber through a channel extending through the plunger during (d);
   (f) plugging the channel and forming a seal between the plunger and the housing after (e);
   (g) increasing the pressure within the inner chamber after (f);
   (h) increasing the pressure within the leaching chamber with the plunger during (g) to a pressure greater than or equal to 20,000 psi;
   (i) partially unthreading the upper cap from the body after (h); and
   (j) removing the seal between the plunger and the housing during (i).

14. The method of claim 13, wherein the plunger has a first side and a second side opposite the first side; and
   wherein the method further comprises:
   applying pressure to the first side of the plunger during (e); and
   engaging the acid within the leaching chamber during (e) and (f).

15. The method of claim 13, further comprising:
   increasing the temperature within the leaching chamber during (h).

16. The method of claim 13, wherein (h) comprises increasing the pressure in the leaching chamber to a pressure between 20,000 psi and 35,000 psi.

17. The method of claim 13, wherein (a) further comprises submerging the PCD table within the acid in the leaching chamber.

* * * * *